No. 744,124. PATENTED NOV. 17, 1903.
G. STERN.
ELECTRIC METER.
APPLICATION FILED JULY 9, 1901.
NO MODEL. 2 SHEETS—SHEET 1.

Witnesses
Harry H. Tilden
Helen Oxford

Inventor.
George Stern.
by Allen A. B. Davis
Att'y

No. 744,124. PATENTED NOV. 17, 1903.
G. STERN.
ELECTRIC METER.
APPLICATION FILED JULY 9, 1901.
NO MODEL. 2 SHEETS—SHEET 2.

Witnesses.
Harry H. Tilden
Helen Oxford

Inventor.
George Stern.
by Allen A. Davis
Att'y.

No. 744,124. Patented November 17, 1903.

UNITED STATES PATENT OFFICE.

GEORGE STERN, OF CHARLOTTENBERG, GERMANY, ASSIGNOR TO GENERAL ELECTRIC COMPANY, A CORPORATION OF NEW YORK.

ELECTRIC METER.

SPECIFICATION forming part of Letters Patent No. 744,124, dated November 17, 1903.

Application filed July 9, 1901. Serial No. 67,636. (No model.)

*To all whom it may concern:*

Be it known that I, GEORGE STERN, a subject of the Emperor of Germany, residing at Charlottenberg, Germany, have invented certain new and useful Improvements in Electric Meters, of which the following is a specification.

My invention relates to electric meters for three-phase systems, and has for its object to devise a novel three-phase meter having two meter systems that will register with substantial accuracy the energy in a three-phase four-wire system.

The known equations which are calculated for the measurement of the energy of three-phase currents are mostly deduced for the case of three conductors. They cannot, therefore, be directly applied to the four-wire three-phase system. In the following specification a general principle is to be evolved which permits of extending the applicability of a formula for a three-wire three-phase system to a system in which four wires are used.

Figure 1:
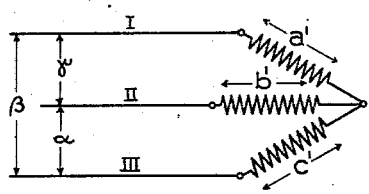
Figure 2:
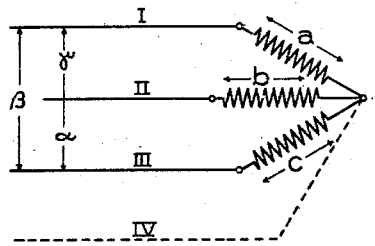
Figure 3:
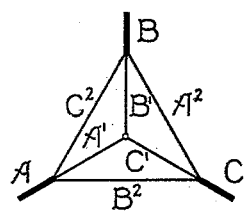
Figure 4:
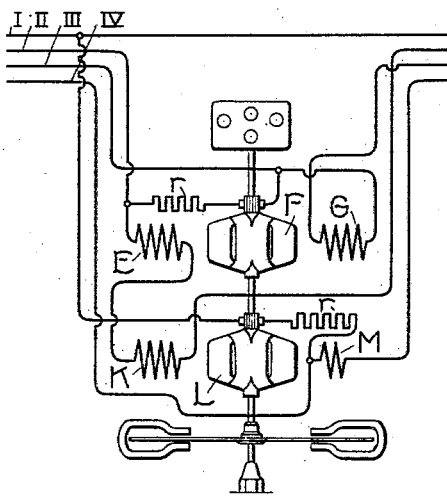
Figure 5:
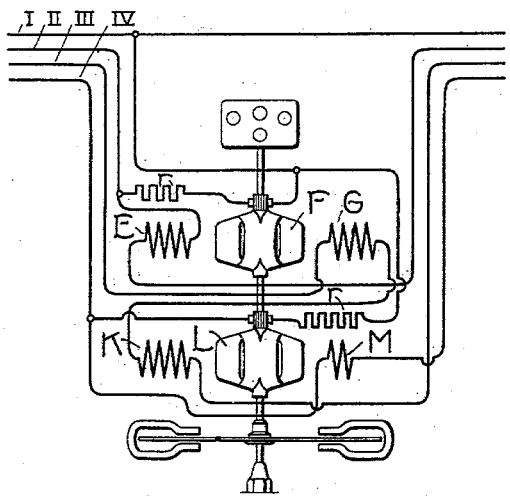
Figure 6:
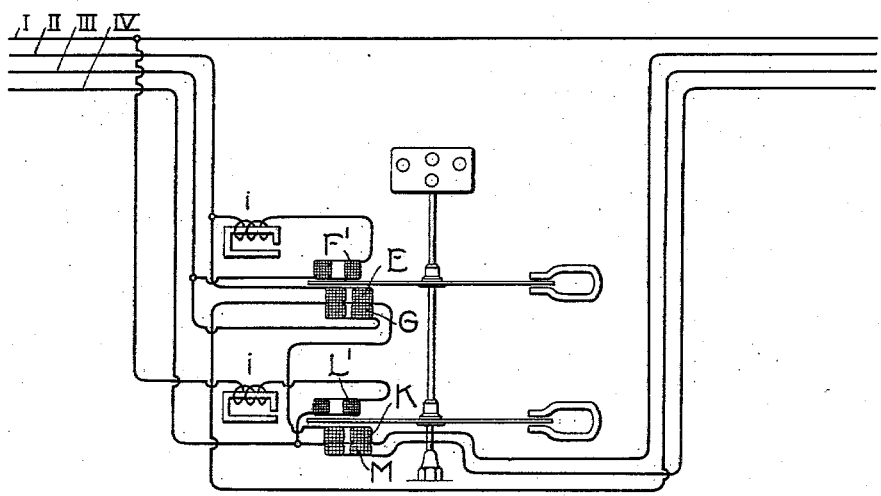
Figure 7:
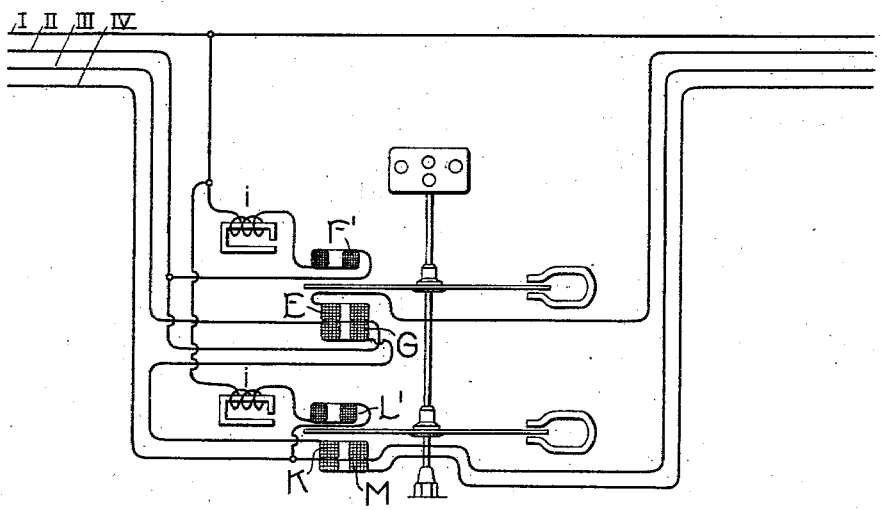

In the drawings annexed to this specification, Figure 1 is a diagram of a three-phase three-wire system of distribution. Fig. 2 is a diagram of a three-phase four-wire system. Fig. 3 is a diagram illustrating the phase relations of the currents in a combined star and triangle coupling of the load-conductors in a three-phase system. Figs. 4 and 5 are diagrams illustrating the connections of the actuating-windings of a commutator-meter when applied to a four-wire three-phase system in accordance with the principles of my invention, and Figs. 6 and 7 are similar diagrams for a meter of the induction type.

Referring to Figs. 1 and 2, let A′, B′, and C′ represent the line-currents flowing in the mains I, II, and III of Fig. 1, for which the condition prevails that $A' + B' + C' = 0$, and let A, B, and C represent the line-currents flowing in the corresponding mains of the system of Fig. 2, for which the condition prevails that $A + B + C + D = 0$, D representing the current flowing in the main IV. The line tensions are assumed to be $\alpha$, $\beta$, and $\gamma$ in both systems. The tensions between the several lines and the neutral point of the system of Fig. 1 are indicated by $a'\, b'\, c'$ and the corresponding tensions in Fig. 2 by $a\, b\, c$. It is assumed that the same energy is transmitted in both systems, thus (1.) $K' = K.$ The energy in the four-wire system is (2.) $K = Aa + Bb + Cc.$ We deduce the following known relation from Fig. 2:

(3.) $\alpha = c - b$ $\beta = a - c$ $\gamma = b - a.$

Since $a + b + c = 0$, it follows from the equations under 3 that $\beta - \gamma = 2a - b - c = 3a$.

$$a = \frac{\beta - \gamma}{3}$$

$$b = \frac{\gamma - \alpha}{3}$$

$$c = \frac{\alpha - \beta}{3}.$$

Equation 2 may then be written as follows:

$3K = \alpha(C - B) + \beta(A - C) + \gamma(B - A.)$

The same deduction evidently applies to Fig. 1, and we may therefore write $3K' = \alpha(C' - B') + \beta(A' - C') + \gamma(B' - A'.)$ According to the assumption $K = K'$, we thus get (4.) $\alpha(C - B) + \beta(A - C) + \gamma(B - A) =$
$\alpha(C' - B') + \beta(A' - C') + \gamma(B' - A'.)$ This equation is satisfied only when $A - C = A' - C'$ (5.) $B - A = B' - A'$ $C - B = C' - B'.$ Now since (6.) $A' + B' + C' = 0$ and $A + B + C + D = 0$ we can put $$A' - \frac{D}{n_A} = A$$

(7.) $$B' - \frac{D}{n_B} = B$$

$$C' - \frac{D}{n_C} = C.$$

(8.) $$\frac{1}{n_A} + \frac{1}{n_B} + \frac{1}{n_C} = 1.$$

If we introduce equation 7 into 5, we get $$0 = D\left(\frac{1}{n_A} - \frac{1}{n_C}\right)$$

$$0 = D\left(\frac{1}{n_B} - \frac{1}{n_A}\right)$$

$$0 = D\left(\frac{1}{n_C} - \frac{1}{n_B}\right).$$

As D must differ generally from $o$, $$\frac{1}{n_A} = \frac{1}{n_B} = \frac{1}{n_C},$$

with reference to equation 8 we get $$\frac{1}{n_A} = \frac{1}{n_B} = \frac{1}{n_C} = \frac{1}{3}.$$

From this follows, according to equation 7, $$A' - \frac{D}{3} = A$$

(9.) $$B' - \frac{D}{3} = B$$

$$C' - \frac{D}{3} = C.$$

This designation can also be directly applied to a combined triangle and star coupling, as may easily be seen, if each main current is divided into partial currents by putting (10.) $\begin{array}{ll} A = A_1 + A_2 & A' = A_1' + A_2 \\ B = B_1 + B_2 & B' = B_1' + B_2 \\ C = C_1 + C_2 & C' = C_1' + C_2, \end{array}$ in which, Fig. 3, the currents designated by the subscript 1 feed the star-coupling, those designated by 2 the triangle-coupling. For $A_1 B_1 C_1$ and $A_1' B_1' C_1'$ we can then find the relations in a similar manner.

$$A_1' - \frac{D}{3} = A_1$$

(10'.) $$B_1' - \frac{D}{3} = B_1$$

$$C_1' - \frac{D}{3} = C_1.$$

Through the addition of $A_2$, $B_2$, and $C_2$, respectively, to the two sides of these equations we again get equations 9.

The transformation comprehended in equation 9 renders possible the modification of the current formulæ for a three-wire rotary-current system into formulæ that will apply to a four-wire system.

The following four equations for the measuring of the current in rotary-current systems with three wires are known, (see German Letters Patent No. 116,115:)

(11.) $\alpha B' - \beta A' = K.$ (12.) $(\gamma - \beta) B' + \alpha (B' - C') = 2 K.$ (13.) $(\alpha - \gamma)(B' - C') + (\beta - \gamma)(C' - A') = 3 K.$ (14.) $(\gamma - \beta) (A' + B') + \gamma (C' - B') = K.$ Substituting the values of A', B', and C' as given in equations 9, we obtain:

(11'.) $\alpha \left(B + \frac{D}{3}\right) - \beta \left(A + \frac{D}{3}\right) = K.$ (12'.) $(\gamma - \beta) \left(B + \frac{D}{3}\right) + \alpha (B - C) = 2 K.$ (13'.) $(\alpha - \gamma)(B - C) + (\beta - \gamma)(C - A) = 3 K.$ (14''.) $(\beta - \gamma) \left(C + \frac{D}{3}\right) + \gamma (C - B) = K.$ (14'.) $(\gamma - \beta)\left(A + B + \frac{2D}{3}\right) + \gamma(C - B) = K.$ Equations 11' and 13' constitute the basis of German Letters Patent No. 109,380.

Equations 12', 14', and 14'' lead to new connections of electric meters, which are intended for multiple-wire three-phase systems. It is to be noted that the differential tensions, $(\gamma - \beta,)$ &c., exist already in a system with neutral lines.

The connections of Fig. 4 of the drawings are given by equation 12'. In this figure, I, II, III, and IV are the mains of a four-wire three-phase system. E and G indicate two current-windings connected to operate in conjunction with a commutated armature-winding F, and these three windings taken together constitute what I have called a "meter system." K and M also indicate two current-windings connected to operate in conjunction with a commutated armature-winding L, and these three windings taken together constitute a second meter system. Resistances $r$ are included in the armature-circuits in order to render them as nearly non-inductive as possible. The winding M, which is included in the main IV, has only one-third as many turns as the other current-windings.

The connections for equation 14'' are shown in Fig. 5 of the drawings. It will be noted that the current-windings E and G are connected in the same mains as in Fig. 4, but that the winding K is now connected in the main III. Also the armature-winding F instead of being connected across the mains II and III is connected across the mains I and II, so that it is supplied with the tension $\gamma$. The armature-winding L is connected to the same mains as in Fig. 4, but the connection is reversed, so that it is supplied with a tension $\beta - \gamma$.

The same formulæ may, according to known principles, be applied to meters of the induction type, and in Figs. 6 and 7 I have illustrated the connections for such meters. In these figures both the current-windings E, G, K, and M and the potential-windings F' and L' constitute fixed coils, which are arranged in inductive relation to a short-circuited armature-disk in a manner well understood. The arrangement of these figures differs from the arrangements shown in Figs. 4 and 5 only in this: that each of the potential-circuits is provided with some means for causing the field due to the shunt-magnet to be displaced in phase by substantially ninety degrees from the potential across the circuit. The phase-displacing means I have indicated as consisting of induction-coils $i$; but evidently any suitable phase-displacing means may be employed.

It is to be understood that the several meter-windings may be connected to the mains in any of the ways known in the art to produce the desired result. It is only necessary that current-windings shall act summationally or differentially, as the case may be, in conjunction with a suitably-connected potential-winding. The current-windings may therefore constitute the two primary coils of a transformer having its secondary connected to a single meter-winding in inductive relation to the corresponding potential-winding, or the two current-windings may of themselves constitute the windings of the meter, in which case they may be wound in two separate coils or in a single coil.

The meters may have any of the ordinary mechanical and electrical constructions, and both of the meter systems, the windings of which are indicated in Figs. 4 and 7, inclusive, will preferably be mounted on a common shaft.

What I claim as new, and desire to secure by Letters Patent of the United States, is—

1. An alternating-current meter for a four-wire three-phase system comprising two meter systems in one of which two current-windings having equal numbers of turns are combined with a single potential-winding and in the other of which two current-windings having a ratio of turns of one to three are combined with a single potential-winding.

2. An alternating-current meter for four-wire three-phase systems comprising two meter systems in one of which current-windings of equal numbers of turns in two of the mains are caused to act differentially, with a potential-winding connected between one of said mains and the third main, and in the other of which two current-windings of unequal numbers of turns, one connected in the same main with one of the aforesaid windings and the other in the neutral main, are caused to act summationally, with a potential-winding connected between the third main and the neutral main.

3. An alternating-current meter for a four-wire three-phase system comprising two meter systems, in one of which current-windings of equal numbers of turns in two of the mains are caused to act differentially, with a potential-winding connected between two of the mains, and in the other of which a current-winding in one of the mains is caused to act summationally with a winding in the neutral main having one-third as many turns, with a potential-winding connected between the neutral and one of the other mains.

4. An alternating-current meter for a four-wire three-phase system comprising two meter systems, in one of which current-windings of equal numbers of turns in two of the mains are caused to act differentially, with a potential-winding connected between two of the mains, and in the other of which a current-winding in one of the mains in which the current-windings of the other meter system are included is caused to act summationally with a winding in the neutral main having one-third as many turns, with a potential-winding connected between the third main and the neutral main.

In witness whereof I have hereunto set my hand this 22d day of June, 1901.

GEORGE STERN.

Witnesses:
HENRY HASPER,
WOLDEMAR HAUPT.